US012600660B2

(12) United States Patent
Kang et al.

(10) Patent No.: US 12,600,660 B2
(45) Date of Patent: Apr. 14, 2026

(54) ANTIBACTERIAL GLASS COMPOSITION, METHOD FOR MANUFACTURING ANTIBACTERIAL GLASS COATING FILM USING SAME, AND HOME APPLIANCE COMPRISING SAME

(71) Applicant: LG ELECTRONICS INC., Seoul (KR)

(72) Inventors: Dongwon Kang, Seoul (KR); Young Seok Kim, Seoul (KR); Deok Hyun Hwang, Seoul (KR); Wongyu Choi, Seoul (KR); Daesung Kim, Seoul (KR); Jegoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 18/274,903

(22) PCT Filed: Jan. 27, 2022

(86) PCT No.: PCT/KR2022/001469
§ 371 (c)(1),
(2) Date: Jul. 28, 2023

(87) PCT Pub. No.: WO2022/169200
PCT Pub. Date: Aug. 11, 2022

(65) Prior Publication Data
US 2024/0092682 A1 Mar. 21, 2024

(30) Foreign Application Priority Data
Feb. 2, 2021 (KR) ........................ 10-2021-0014582

(51) Int. Cl.
*C03C 3/066* (2006.01)
*C03B 19/06* (2006.01)
(Continued)

(52) U.S. Cl.
CPC .............. *C03C 3/066* (2013.01); *C03B 19/06* (2013.01); *C03B 27/012* (2013.01); *C03C 1/02* (2013.01);
(Continued)

(58) Field of Classification Search
CPC .. C03C 3/066; C03C 1/02; C03C 8/04; C03C 17/04; C03C 2205/00; C03C 2207/00;
(Continued)

(56) References Cited

U.S. PATENT DOCUMENTS

2006/0142413 A1* 6/2006 Zimmer .................. C03C 3/089
523/122
2006/0166806 A1 7/2006 Fechner et al.
(Continued)

FOREIGN PATENT DOCUMENTS

| CN | 111517640 | 8/2020 |
| EP | 4180399 | 5/2023 |

(Continued)

OTHER PUBLICATIONS

Machine translation of JP 2000-072487 Matano et al. Obtained from EPO. (Year: 2000).*
(Continued)

*Primary Examiner* — Megha M Gaitonde
(74) *Attorney, Agent, or Firm* — KED & ASSOCIATES, LLP

(57) ABSTRACT
There is disclosed an antibacterial glass composition, a preparing method of an antibacterial glass coating film using the same and an electric home appliance including the same. The antibacterial glass composition according to the present disclosure and the antibacterial glass coating film using the same are applied to an electric home appliance, thereby exhibiting excellent antibacterial properties and heavy metal elution safety, and exhibiting excellent transmittance (70% or more) when applied to a transparent glass substrate.

17 Claims, 1 Drawing Sheet

Staphylococcus aureus antimicrobial activity evaluation result:
(Left) Before applying Antibacterial glass of Embodiment 1
(Right) After applying Antibacterial glass of Embodiment 1

Escherichia coli antimicrobial activity evaluation result
(Left) Before applying Antibacterial glass of Embodiment 2
(Right) After applying Antibacterial glass of Embodiment 2

(51) Int. Cl.

| | |
|---|---|
| *C03B 27/012* | (2006.01) |
| *C03C 1/02* | (2006.01) |
| *C03C 8/04* | (2006.01) |
| *C03C 17/04* | (2006.01) |
| *C23D 5/00* | (2006.01) |

(52) U.S. Cl.
CPC ................ *C03C 8/04* (2013.01); *C03C 17/04* (2013.01); *C23D 5/00* (2013.01); *C03C 2205/00* (2013.01); *C03C 2207/00* (2013.01); *C03C 2217/70* (2013.01); *C03C 2218/32* (2013.01)

(58) Field of Classification Search
CPC ........... C03C 2217/70; C03C 2218/32; C03C 2204/02; C03C 12/00; C03C 1/024; C03B 19/06; C03B 27/012; C23D 5/00
See application file for complete search history.

(56) References Cited

U.S. PATENT DOCUMENTS

| | | |
|---|---|---|
| 2007/0122356 A1 | 5/2007 | Kessler et al. |
| 2007/0172661 A1 | 7/2007 | Fechner et al. |
| 2012/0034435 A1 | 2/2012 | Borrelli et al. |

| | | |
|---|---|---|
| 2021/0047232 A1 | 2/2021 | Gwoo et al. |
| 2022/0272981 A1 | 9/2022 | Kim et al. |

FOREIGN PATENT DOCUMENTS

| | | | | |
|---|---|---|---|---|
| EP | 4180399 A1 * | 5/2023 | ............. | C03C 3/097 |
| JP | 11-228173 | 8/1999 | | |
| JP | 2000072487 A * | 3/2000 | .......... | C03C 17/009 |
| JP | 2000302478 * | 10/2000 | | |
| JP | 2006-520311 | 9/2006 | | |
| JP | 2007-507408 | 3/2007 | | |
| JP | 2009-023877 | 2/2009 | | |
| JP | 2018-104222 | 7/2018 | | |
| KR | 10-2007-0015393 | 2/2007 | | |
| KR | 10-2018-0064557 | 6/2018 | | |
| KR | 10-2019-0123570 | 11/2019 | | |
| KR | 10-2021-0007296 | 1/2021 | | |
| WO | WO-2005033034 A1 * | 4/2005 | ............. | A01N 59/16 |
| WO | WO-2019208975 A1 * | 10/2019 | ............. | C03C 3/062 |

OTHER PUBLICATIONS

Extended European Search Report dated Jan. 30, 2025 issued in Application No. 22749950.6.
International Search Report (with English Translation) issued in Application No. PCT/KR2022/001469 dated May 12, 2022.

* cited by examiner

FIG. 1:

Staphylococcus aureus antimicrobial activity evaluation result:
(Left) Before applying Antibacterial glass of Embodiment 1
(Right) After applying Antibacterial glass of Embodiment 1

Escherichia coli antimicrobial activity evaluation result
(Left) Before applying Antibacterial glass of Embodiment 2
(Right) After applying Antibacterial glass of Embodiment 2

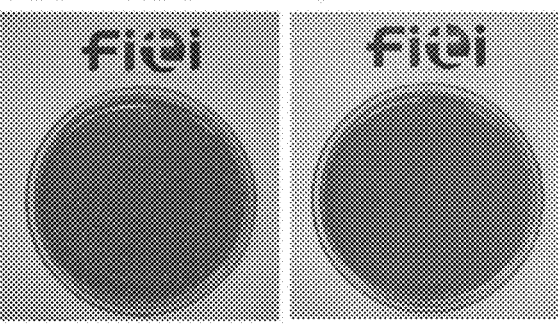
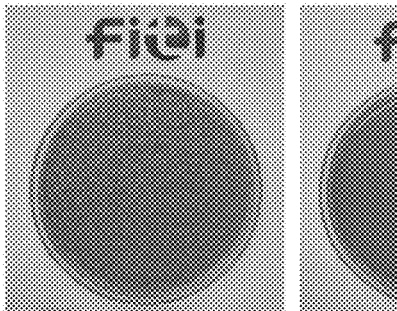
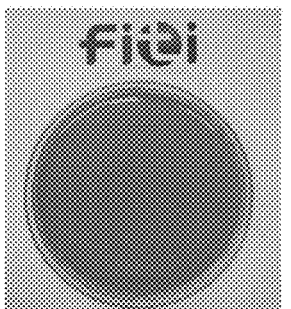

FIG. 2:

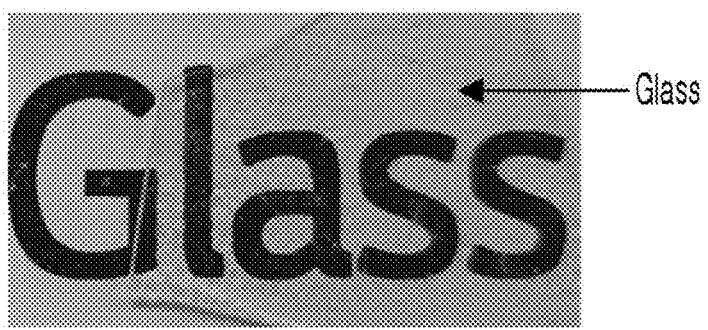

Glass

ANTIBACTERIAL GLASS COMPOSITION, METHOD FOR MANUFACTURING ANTIBACTERIAL GLASS COATING FILM USING SAME, AND HOME APPLIANCE COMPRISING SAME

CROSS-REFERENCE TO RELATED PATENT APPLICATIONS

This application is a U.S. National Stage Application under 35 U.S.C. § 371 of PCT Application No. PCT/KR2022/001469, filed Jan. 27, 2022, which claims priority to Korean Patent Application No. 10-2021-0014582 filed on Feb. 2, 2021, whose entire disclosures are hereby incorporated by reference.

BACKGROUND

Technical Field

The present disclosure relates to an antibacterial glass composition, a preparing method of a glass coating film using the same, and an electric home appliance including the same.

Background Art

Microorganisms such as germs, fungi and bacteria are ubiquitous in our living spaces (e.g., washbasins, refrigerator shelves and washing machines). If these microbes get into our bodies, they cause life-threatening infections. Accordingly, it is required to solve a problem of hygiene by suppressing the generation and propagation of bacteria and fungi from home appliances.

There is an increasing need for providing an electric home appliance with an antibacterial function to strengthen hygiene by suppressing bacteria and fungi in electric home appliances, especially kitchen appliances.

The prior art disclosed in the Korean patent application publication No. 10-2018-0064557 relates to "Chemically Enhanced Antimicrobial Coated Glass and its Manufacturing Method." According to the prior art, to enhance the strength of glass, antibacterial properties by silver Ag may be secured by allowing a surface of glass to contain silver Ag at the same time as compressive stress through an ion exchange reaction using potassium nitrate containing silver nitrate during ion exchange during a chemical strengthening process.

However, the glass disclosed in the prior art is applied to products of hospitals, laboratories and facilities handling biological substances, so it has limitations in application to home appliances. Since an antibacterial factor is provided to the glass surface through the ion exchange reaction, the dissolution safety could be insufficient. Since the color and transparency of the glass are not considered, there is a problem that it cannot be applied to glass shelves and windows requiring transparency.

Accordingly, there is a need to develop an antibacterial glass composition applicable to various electric home appliances including kitchen appliances such as refrigerators, ovens and microwave ovens, and interior devices such as glass shelves for home, office use and glass windows, and securing transparency while having excellent dissolution safety of antibacterial factors, and an antibacterial glass coating film using the same.

(Cited patent document 1) Korean Patent Publication No. 10-2018-0064557

DESCRIPTION OF DISCLOSURE

Technical Problems

Accordingly, an object of the present disclosure is to address the above-noted hygiene problem of bacteria and fungi propagating in home appliances and other problems and to provide an antibacterial glass composition and a preparing method of an antibacterial glass coating film using the same.

Another object of the present disclosure is to provide an antibacterial glass composition capable of exhibiting antibacterial activity while exhibiting excellent dissolution safety of antibacterial factors, and a preparing method of an antibacterial glass coating film using the same.

A further object of the present disclosure is to provide an antibacterial glass composition capable of securing conventional glass properties such as transparency, while exhibiting antibacterial activity, and a preparing method of an antibacterial coating film using the same.

A further object of the present disclosure is to provide an antibacterial glass composition and an electric home appliance including an antibacterial glass coating film using the same.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To solve the above technical problems, an antibacterial glass composition according to the present disclosure may include 20-40% by weight of $SiO_2$; 1.5 to 10% by weight of $B_2O_3$; 2-10% by weight of $Na_2O$; 2-15% by weight of $K_2O$; 1-5% by weight of CaO; and 20-40% by weight of ZnO.

The sum of the $Na_2O$, $K_2O$ and CaO may be 30% by weight or less.

The antibacterial glass composition may further include at least one of CuO and $Fe_2O_3$. At this time, the CuO may be added in a content ratio of 0 to 5% by weight, and the $Fe_2O_3$ is added in a content ratio of 1 to 3% by weight.

A vitrification temperature Tg of the antibacterial glass composition may be 500° C. or less. The vitrification temperature Tg of the antibacterial glass composition may be preferably 400 to 500° C.

The transmittance of the antibacterial glass coating film may be 70% or more. The antibacterial glass coating film may have a thickness of 1 to 50 μm.

Advantageous Effect

The antibacterial glass composition according to present disclosure may have an effect of excellent antibacterial activity by suppressing the growth of bacteria and fungi in an electric home appliance, while having excellent dissolution safety of antibacterial factors.

In addition, even if formed as an antibacterial glass coating film, glass properties may be sufficiently secured and in particular, excellent transparency with a transmittance of 70% or more may be exhibited.

In the preparing method of the antibacterial glass coating film, the heat treatment process for forming the antibacterial glass coating film and the thermal strengthening process of the glass substrate may be performed simultaneously, thereby making the overall process efficient and reducing the process cost.

Specific effects are described along with the above-described effects in the section of detailed description.

DESCRIPTION OF REFERENCE NUMERALS

FIG. 1 is a photograph showing the results of antibacterial activity evaluation tests for *Staphylococcus aureus* and *Escherichia coli* for Embodiment 1 and 2;

FIG. 2 is a photograph partially showing a cullet of glass formed of an antibacterial glass composition according to an embodiment of the present disclosure; and FIG. 3 is a photograph showing a state in which a glass coating film using an antibacterial glass composition according to an embodiment of the present disclosure is applied to a glass substrate.

BEST MODE

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Hereinafter, an antibacterial glass composition according to the present disclosure will be described in detail.

<Antibacterial Glass Composition>

The antibacterial glass composition according to the present disclosure may include 20 to 40% by weight of $SiO_2$; 1.5 to 10% by weight of $B_2O_3$; 2-10% by weight of $Na_2O$; 2-15% by weight of $K_2O$; 1-5% by weight of CaO; And by including 20 to 40% by weight of ZnO. Accordingly, the antibacterial glass composition may have excellent transparency with a transmittance of 70% or more even when applied as a glass coating film, while both dissolution safety and antibacterial activity of antibacterial factors are excellent. The thickness of the coating film may be 1 to 50 μm in order to secure excellent transmittance.

More specifically, the antibacterial glass composition according to the present disclosure may have an antibacterial activity of 99.99% or more based on *Staphylococcus aureus* and *Escherichia coli*, which are commonly propagated in home appliances.

Here, the sum of $Na_2O$, $K_2O$ and CaO is 30% by weight or less.

In addition, the antibacterial glass composition may further include at least one of CuO and $Fe_2O_3$. At this time, CuO is 5% by weight or less and $Fe_2O_3$ may be 3% by weight or less.

The antibacterial glass composition according to the present disclosure may have a vitrification temperature Tg of 400° C. to 500° C. Accordingly, the antibacterial glass composition according to the present disclosure has a problem that when the vitrification temperature exceeds 500° C., the glass film formation heat treatment process and the glass substrate thermal strengthening process cannot be performed simultaneously, and the process is not efficient.

Hereinafter, the role and content of each component of the antibacterial glass composition according to the present disclosure will be described in detail.

$SiO_2$ is a network-forming oxide, and it is a key component to form glass that serves as a framework in terms of a glass structure. When such $SiO_2$ is provided in an appropriate amount, the viscosity increases during glass melting, and thus workability and yield decreases during the cooling process.

Accordingly, it is preferred to provide $SiO_2$ in a content ratio of 20 to 40% by weight of the total weight of the antibacterial glass composition according to the present disclosure. If the content of $SiO_2$ is less than 20% by weight, crystallization occurs during the glass melting, which might cause a problem that stable glass cannot be formed. in contrast, when the added amount of $SiO_2$ exceeds 40% by weight, it is advantageous for vitrification but the melting temperature rises. As the vitrification temperature Tg rises, the firing temperature for securing a transparent glass film increases during a process of forming a glass coating film using glass powder, so that it is impossible to simultaneously apply a process of thermal strengthening.

$B_2O_3$ is a representative network-forming oxide and a key component facilitating sufficient vitrification, together with $SiO_2$. $B_2O_3$ has a low melting point and is used to lower the eutectic point of a melt. In addition, $B_2O_3$ serves a role of increasing the solubility of rigid components (e.g., $Al_2O_3$, CuO, etc.) during a process of melting for vitrification, thereby helping to form a homogeneous glass. However, when $B_2O_3$ is added in a certain amount, there is a problem of deteriorating water resistance by weakening the bonding structure of glass.

To this end, $B_2O_3$ may be added in a content ratio of 1.5 to 10% by weight of the total weight of the antibacterial glass composition according to the present disclosure. When $B_2O_3$ is added in a content ratio of less than 1.5% by weight, the fluxing agent is insufficient and then is out of a vitrification region, thereby causing a non-melting phenomenon. Conversely, when the content ratio of $B_2O_3$ exceeds 10% by weight, a decrease in water resistance might occur due to the structural properties of element B in the network-forming structure.

Alkali oxides such as $Na_2O$ and $K_2O$ are oxides that act as network modifiers for non-crosslinking in the glass composition. Although these components cannot be vitrified alone, they can be vitrified when mixed with network forming agents such as $SiO_2$ and $B_2O_3$ in a certain ratio. If only one of the components is included in the glass composition, the durability of the glass may be weakened in a vitrifiable region. However, when two or more components are included in the glass composition, the durability of the glass is improved again depending on the ratio. This is called the mixed alkali effect. Therefore, alkali oxides such as $Na_2O$ and $K_2O$ improve antibacterial activity by using the fact that alkali oxides first occupy a modified oxide site in glass.

Accordingly, based on the total weight of the antibacterial glass composition, $Na_2O$ may be added in a content ratio of 2 to 10% by weight, and $K_2O$ may be preferably added in a content ratio of 2 to 15% by weight. When $Na_2O$ and $K_2O$ are added in an amount of less than 2% by weight, a phenomenon in which unmelted material is formed may occur due to leaving the vitrification region due to insufficient melting agent. Conversely, when $Na_2O$ and $K_2O$ are added in a large amount exceeding 10% by weight and 15% by weight, alkali ions are easily substituted with $H_3O^+$ ions of water according to the basic elution mechanism of glass, and elution intensifies. Water resistance degradation may occur.

Alkaline earth oxides such as CaO are basically oxides that act as non-crosslinking modifier oxides in glass. It is impossible to vitrify alone, but vitrification becomes possible when mixed with network forming agents such as $SiO_2$ and $B_2O_3$ in a certain ratio.

Since alkaline earth oxides such as CaO have a +2 charge unlike alkali oxides, they must be replaced with two water molecule ions, ion exchange is relatively difficult. Accordingly, alkaline earth oxides are sometimes used as durability enhancement elements. Alkaline earth oxides such as CaO are used for the same purpose as alkaline oxides, which structurally indirectly contribute to exhibiting water insolubility and antibacterial properties by occupying the site of the modified oxide and having strong durability among the modified oxides.

CaO may be added in a content ratio of 1 to 5% by weight of the total weight of the antibacterial glass composition according to the present disclosure. When CaO is less than 1% by weight, the structure of the modified oxide site cannot be strengthened, so that alkali elution cannot be prevented and water resistance might be reduced. Conversely, when the CaO content ratio exceeds 5% by weight, alkaline earth oxides, which are substances melting at high temperatures, are not sufficiently melted and thus non-melted material might be formed due to leaving the vitrification region.

Here, $Na_2O$, $K_2O$ and CaO, which serve as network forming agent, have the effect of lowering the vitrification temperature but the sum of $Na_2O$, $K_2O$ and CaO may be 30% by weight or less of the total weight of the antibacterial glass composition according to the present disclosure. When the sum of $Na_2O$, $K_2O$ and CaO exceeds 30% by weight to be added in excess, there might be a problem of crystallization occurrence.

ZnO is substituted with a part of the network-forming oxide and covalently bonded to serve both a role of the network-type oxide and a role of the modified oxide. Also, ZnO is a component serving to lower the vitrification temperature and a component exhibiting an antibacterial effect.

ZnO is an intermediate oxide, and in order to participate in the network-forming structure in glass, ZnO must have a small atomic radius and a high electronegativity so the difference with oxygen must be small. These intermediate oxides refer to the ingredients that have a larger atomic radius than typical network-forming oxides such as Si, P and B, and have low electronegativity, which makes it difficult to form glass alone but in the presence of network-forming oxides, they are substituted with network-forming oxides to play their role. Such ZnO serves only as a modified oxide below a predetermined content ratio, but forms a covalent bond above a certain content ratio. Accordingly, durability might be rapidly improved. Here, the predetermined content is determined by the content of the network-forming oxide and the modified oxide.

Accordingly, ZnO may be added in a content ratio of 20 to 50% by weight of the total weight of the antibacterial glass composition according to the present disclosure. When ZnO is added in a content ratio of less than 20% by weight, there is a problem that sufficient antibacterial activity is not expressed because the absolute amount of the material exhibiting the antibacterial activity is insufficient. Conversely, when ZnO is added in excess of 40% by weight, ZnO does not exist in an ionic state in the glass homogenously, and opacification occurs due to partially forming crystals and leaving the vitrification region. Also, a heterogenization phenomenon occurs in which transparent glass is mixed. As a result, a vitrification forming region is narrowed and a problem occurs that stable glass cannot be manufactured.

CuO and $Fe_2O_3$ are components that function glass to express the effect of maximizing the antibacterial activity of its own. In addition, CuO and $Fe_2O_3$ serve to improve the adhesion of the glass coating film by causing a chemical bond between a substrate and glass when the glass is used as a coating material on a low carbon steel substrate. However, when CuO and $Fe_2O_3$ are added in excess, crystallization occurs and the color of the glass is blackened. Accordingly, to secure transparency, it is preferred that CuO and $Fe_2O_3$ are added in a small amount.

From this point of view, the antibacterial glass composition according to the present disclosure may further include at least one of CuO and $Fe_2O_3$. At this time, CoU may be added in a content ratio of 0 to 5% by weight and $Fe_2O_3$ may be added in a content ratio of 0 to 3% by weight.

<Preparing Method of Antibacterial Glass Power>

Next, a preparing method of antibacterial glass powder according to the present disclosure will be described in detail.

The preparing method of the antibacterial glass powder may include a step of preparing the materials of the above-described antibacterial glass composition; a step of manufacturing an antibacterial glass cullet by melting and cooling the antibacterial glass composition materials; and a step of forming antibacterial glass powder by dry-pulverizing the antibacterial glass cullet.

<Preparing Method of Antibacterial Glass Coating Film>

The prepared antibacterial glass powder may be coated on one surface of a target material. The target object may be a part of all of a glass substrate, a metal substrate or an electric home appliance.

Hereinafter, a method of preparing method of an antibacterial glass coating film by using the antibacterial glass powder according to the present disclosure will be described.

The preparing method of the antibacterial glass coating film may include a step of forming an antibacterial glass paste by mixing the above-described glass powder and an organic material; coating the antibacterial glass paste on a substrate; a step of sintering the glass substrate coated with the antibacterial glass paste; and a step of forming a transparent antibacterial glass film on the sintered glass substrate.

In the preparing the antibacterial glass coating film according to the present disclosure, the step of sintering the glass substrate coated with the antibacterial glass paste and the process of thermal strengthening the glass substrate may be performed simultaneously.

The organic material mixed to form the antibacterial glass paste may include an organic solvent and an organic binder. The organic solvent may be a solvent such as α-terpineol or butyl carbitol, and the organic binder may use ethyl cellulose, but the present disclosure is not limited thereto.

A coating method used in the step of coating the antibacterial glass paste on the substrate may be a method of applying paste to a surface of a target object and firing it or a spraying method. Various coating methods may be used, not limited thereto. the antibacterial glass composition may be fired for 300 to 450 seconds at a temperature range of 700 to 750° C.

DESCRIPTION OF SPECIFIC EMBODIMENTS

Hereinafter, specific embodiments of the present disclosure will be described.

Embodiments

Hereinafter, elements and features of the present disclosure will be described in detail through embodiments herewith. The description and embodiments herewith are exemplary and the present disclosure is not limited thereto.

The above-described aspects, features and advantages are specifically described hereunder with reference to the accompanying drawings such that one having ordinary skill in the art to which the present disclosure pertains can easily implement the technical spirit of the disclosure. Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

<Preparing Antibacterial Glass Composition and Powder>

An antibacterial glass composition having the composition and content shown in Table 1 is prepared. Raw materials of each component are sufficiently mixed. The mixed raw material composition is melted at a temperature of 1200 in an electric furnace, and then quenched in a quenching roller to obtain an antibacterial glass cullet.

The antibacterial glass cullet obtained through the above-described process is dry-pulverized with a ball mill to finally prepare antibacterial glass powder.

Table 1 below shows the component and its content of the antibacterial glass composition according to Embodiments 1 and 2 and Comparative embodiments 1 to 3, vitrification status and vitrification temperature Tg.

TABLE 1

| | Ingredient Content (wt %) | | | | |
| Ingredient | Embodiment 1 | Embodiment 2 | Comparative embodiment 1 | Comparative embodiment 2 | Comparative embodiment 3 |
| --- | --- | --- | --- | --- | --- |
| $SiO_2$ | 35 | 35 | 37 | 45 | 24 |
| $B_2O_3$ | 2.5 | 2.5 | 10 | 2.5 | 2.5 |
| $Na_2O$ | 9.6 | 9.6 | 9.6 | 9.6 | 9.6 |
| $K_2O$ | 9.6 | 9.6 | 9.6 | 9.6 | 9.6 |
| ZnO | 39 | 38 | 29.5 | 29 | 50 |
| CaO | 4.3 | 4.3 | 4.3 | 4.3 | 4.3 |
| CuO | — | — | — | — | — |
| Total | 100 | 100 | 100 | 100 | 100 |
| Vitrified or not | ○ | ○ | ○ | ○ | X |
| Tg | 475° C. | 473° C. | 498° C. | 520° C. | — |

<Preparing Antibacterial Glass Coating Film>

The antibacterial glass powder obtained through the above-described process is mixed with an organic solvent and an organic binder, to form paste. Next, the paste is applied on the glass substrate and re-fired to form a transparent antibacterial glass coating film on the glass substrate. Then, glass substrate specimens are prepared.

Experimental Example 1—Light Transmittance Test

As shown in Table 1, it is confirmed that the manufactured specimens of Embodiments 1 and 2 and Comparative embodiments 1 and 2 are vitrified. Accordingly, with respect to the specimens prepared in Embodiments 1 and 2 and Comparative embodiments 1 and 2 in which vitrificaiton was performed, light transmittance (transmittance %) was measured with a hazemeter and the results are shown in Table 2 below.

Experimental Example 2—Antibacterial Activity Evaluation Test

With respect to the specimens of the glass substrate coated with the antibacterial glass film of Embodiment 1 and 2 and Comparative embodiments 1 and 2, antibacterial activity against *Staphylococcus aureus* and *Escherichia coli* was evaluated by an antibacterial standard test (JIS Z 2801, film attachment method). The results are shown in Table 2.

TABLE 2

| Category | | Embodiment 1 | Embodiment 2 | Comparative embodiment 1 | Comparative embodiment 2 |
| --- | --- | --- | --- | --- | --- |
| Coating film properties | Re-fired or not | ○ | ○ | ○ | ○ |
| | Transmittance (%) | 75 | 72 | 55 | <50 |
| Antibacterial activity (%) | *Staphylococcus aureus* | 99.99< | 99.99< | 99 | 99 |
| | *Escherichia coli* | 99.99< | 99.99< | 99 | 99 |

Experimental Example 3—Antibacterial Effect Test

With respect to the specimens of Embodiments 1 and 2, heavy metal dissolution was measured at 32 hours and a temperature of 50° C. The results of the measurement are shown in Table 3.

TABLE 3

| | Elution water component analysis (unit: ppm) | | | | | | | |
|---|---|---|---|---|---|---|---|---|
| | Si | B | Na | K | Ca | Zn | Cu | Ag |
| Embodiment 1 | 6.7 | 0.37 | 20.2 | 10.7 | 2.0 | 0.25 | 0.00106 | 0.0002 |
| Embodiment 2 | 6.9 | 0.38 | 17.3 | 9.2 | 4.2 | 0.12 | 0.00022 | 0.00018 |

As shown in Table 3, the antibacterial glass coating composition according to the present disclosure has excellent metal dissolution safety conditions.

What is claimed is:

1. An antibacterial glass composition comprising:
20-35% by weight of silicon dioxide ($SiO_2$);
1.5 to 10% by weight of boron trioxide ($B_2O_3$);
2-10% by weight of sodium oxide ($Na_2O$);
2-15% by weight of potassium oxide ($K_2O$);
1-5$ by weight of calcium oxide (CaO);
38-40% by weight of zinc oxide (ZnO), and
at least one of: more than 0 to 5% by weight of copper (II) oxide (CuO), or 1 to 3% by weight of ferric oxide ($Fe_2O_3$).

2. The antibacterial glass composition of claim 1, wherein the antibacterial glass composition comprises 30% or less by weight of a sum of $Na_2O$, $K_2O$, and CaO.

3. The antibacterial glass composition of claim 1, wherein a glass transition temperature Tg of the antibacterial glass composition is 500° C. or less.

4. The antibacterial glass composition of claim 3, wherein the glass transition temperature Tg of the antibacterial glass composition is 400 to 500° C.

5. The antibacterial glass composition of claim 1, wherein an antibacterial activity of the antibacterial glass composition against microorganisms is 99.99% or more.

6. The antibacterial glass composition of claim 5, wherein the microorganisms include at least one of *Staphylococcus aureus* or *Escherichia coli*.

7. The antibacterial glass composition of claim 1, wherein the antibacterial glass composition forms an antibacterial glass powder.

8. The antibacterial glass composition of claim 7, wherein:
the antibacterial glass composition is melted and cooled to form an antibacterial glass cullet, and
the antibacterial glass cullet is pulverized to form the antibacterial glass powder.

9. The antibacterial glass composition of claim 1, wherein the antibacterial glass composition is formed into an antibacterial glass coating film.

10. The antibacterial glass composition of claim 9, wherein the antibacterial glass coating film has a thickness of 1 to 50 μm.

11. The antibacterial glass composition of claim 9, wherein a transmittance of the antibacterial glass coating film is 70% or more.

12. The antibacterial glass composition of claim 9, wherein:
the antibacterial glass composition is melted and cooled to form an antibacterial glass cullet;
the antibacterial glass cullet is pulverized to form an antibacterial glass powder;
the antibacterial glass powder is mixed with an organic material to form an antibacterial glass paste;
the antibacterial glass paste is coated on a glass substrate; and
the glass substrate coated with the antibacterial glass paste is sintered to form the antibacterial glass coating film on the glass substrate.

13. The antibacterial glass composition of claim 12, wherein the glass substrate is thermally strengthened during sintering of the glass substrate coated with the antibacterial glass paste.

14. The antibacterial glass composition of claim 1, wherein the antibacterial glass composition is provided on a surface of a home appliance.

15. The antibacterial glass composition of claim 1, wherein the antibacterial glass composition is provided on a surface of a metal substrate.

16. The antibacterial glass composition of claim 12, wherein the organic material includes at least one of an organic solvent or an organic binder, the organic solvent includes at least one of α-terpineol or butyl carbitol, and the organic binder includes ethyl cellulose.

17. The antibacterial glass composition of claim 12, wherein sintering the glass substrate coated with the antibacterial glass paste includes heating the glass substrate coated with the antibacterial glass paste for 300 to 450 seconds at a temperature range of 700 to 750° C.

* * * * *